May 25, 1965 J. NATHAN ETAL 3,185,280
VENDING MACHINE
Filed Aug. 14, 1962 8 Sheets-Sheet 1
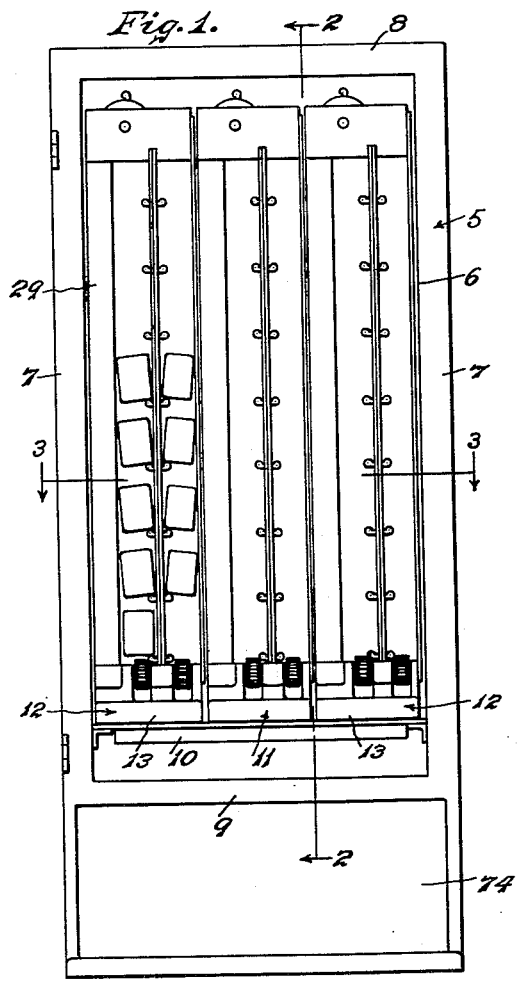
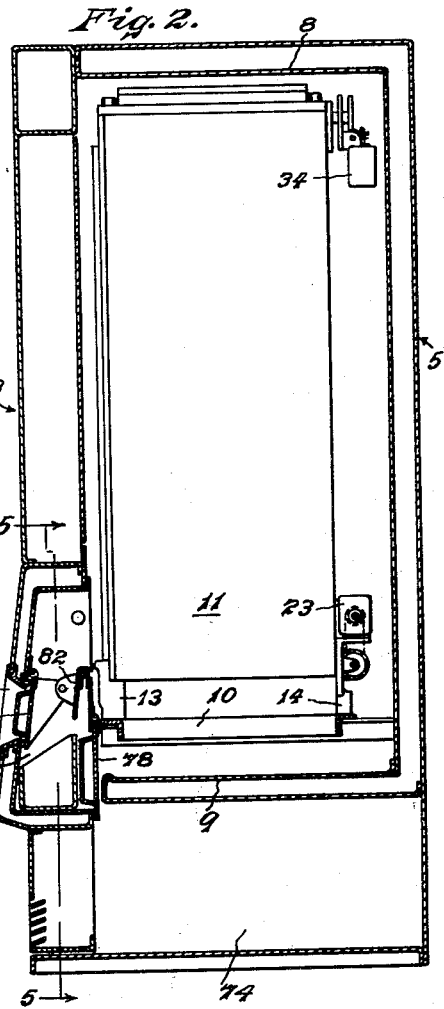
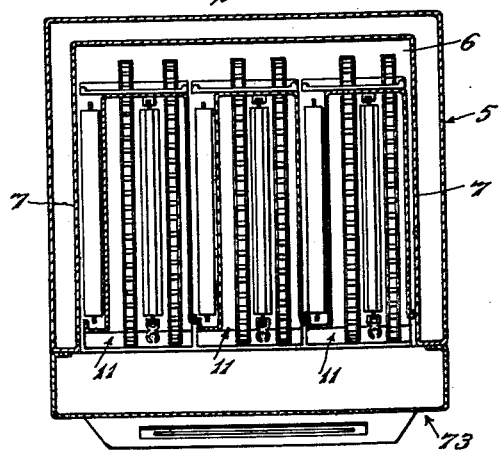
INVENTORS.
JEROME NATHAN.
BY HENRY L. HELMAR.
CHARLES E. REBURN.
Louis V. Lucia
ATTORNEY.

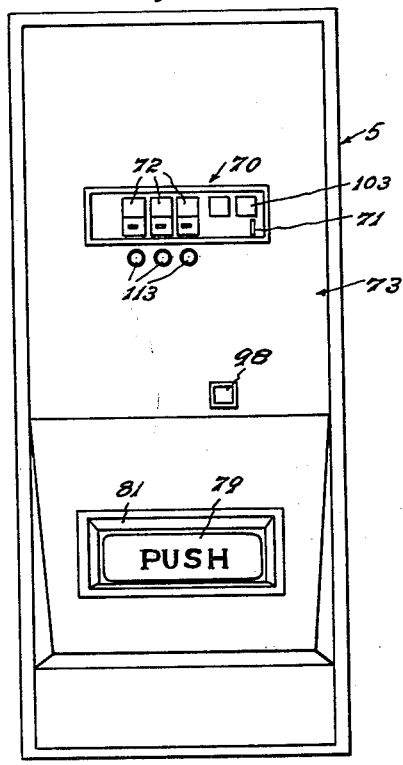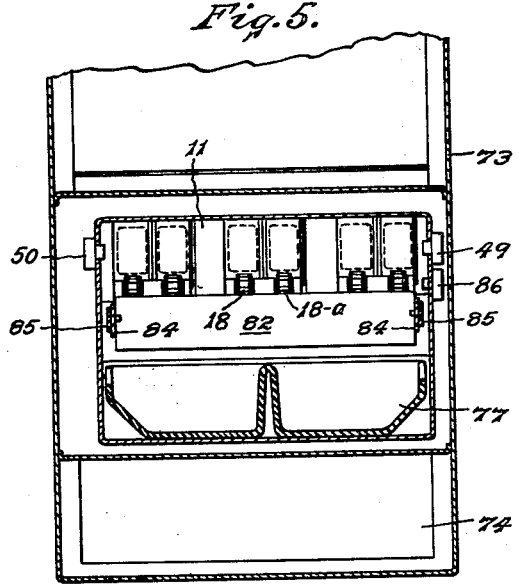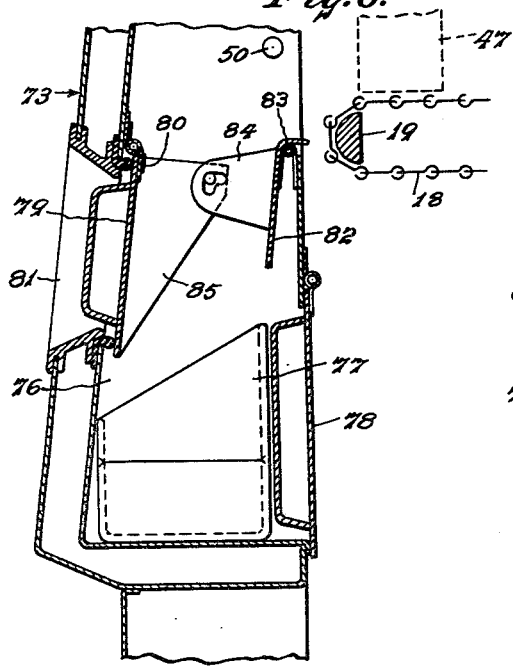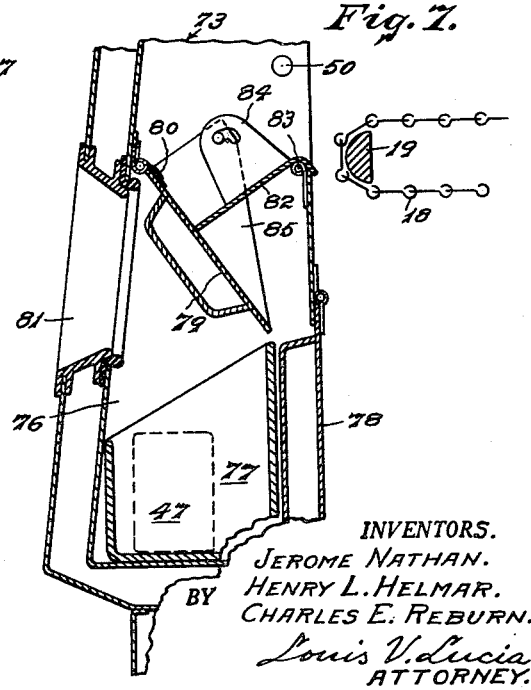

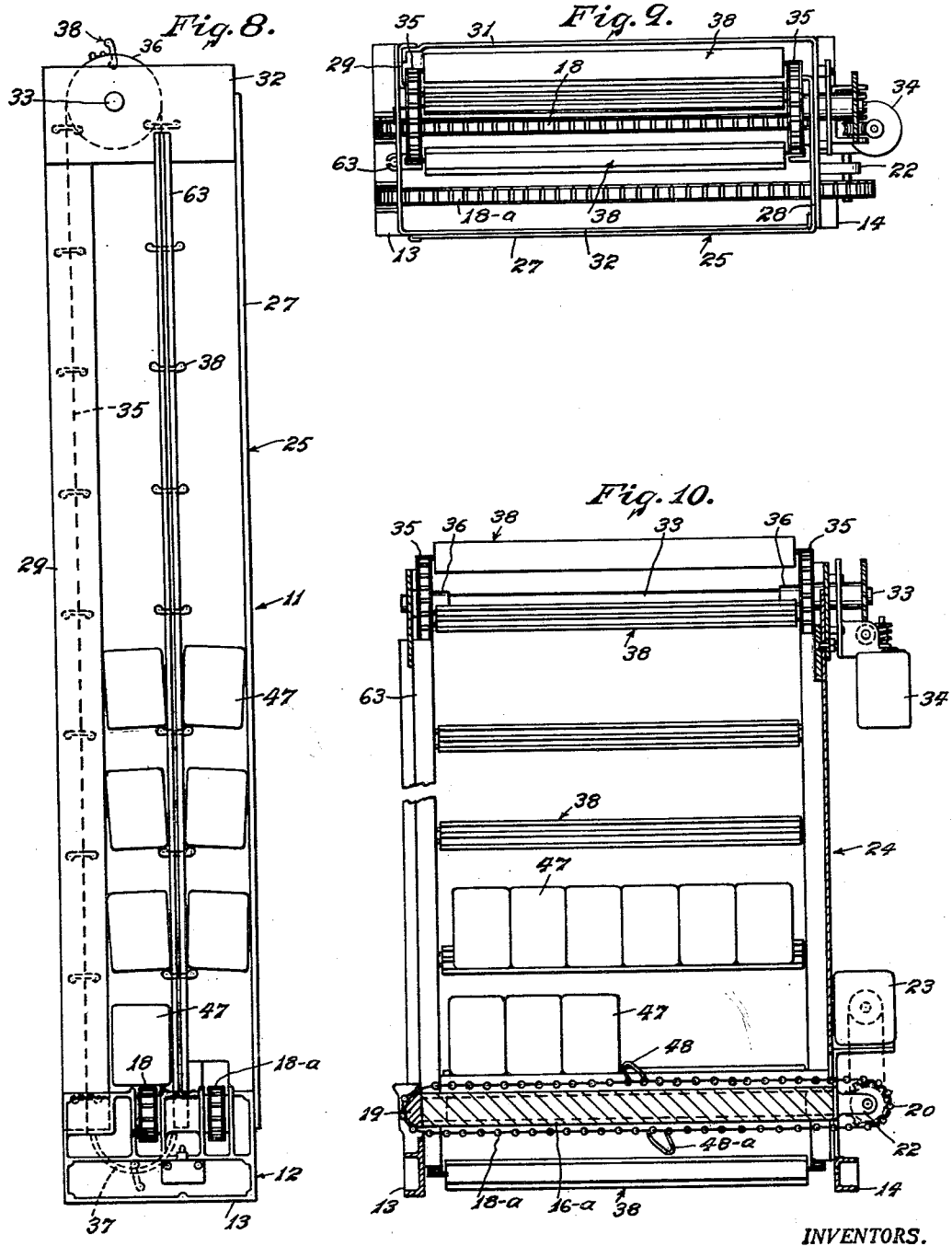

May 25, 1965 J. NATHAN ETAL 3,185,280
VENDING MACHINE
Filed Aug. 14, 1962 8 Sheets-Sheet 4

INVENTORS.
JEROME NATHAN.
HENRY L. HELMAR.
BY CHARLES E. REBURN.

Louis V. Lucia
ATTORNEY.

May 25, 1965　　　J. NATHAN ETAL　　　3,185,280
VENDING MACHINE
Filed Aug. 14, 1962　　　　　　　　　8 Sheets-Sheet 5
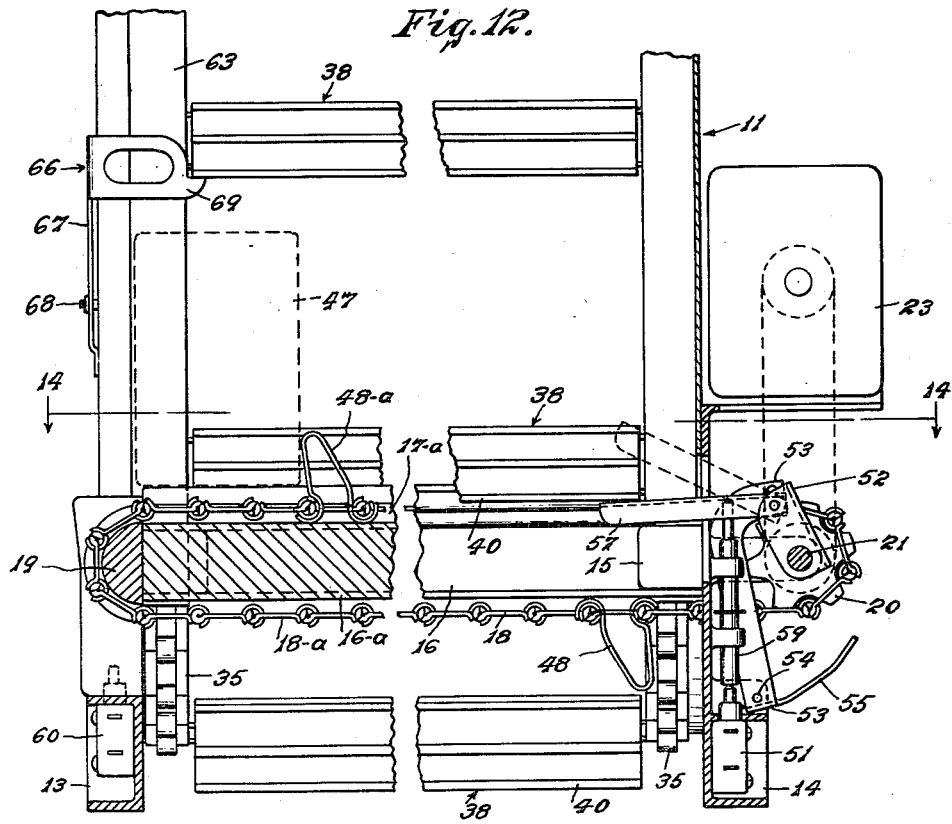
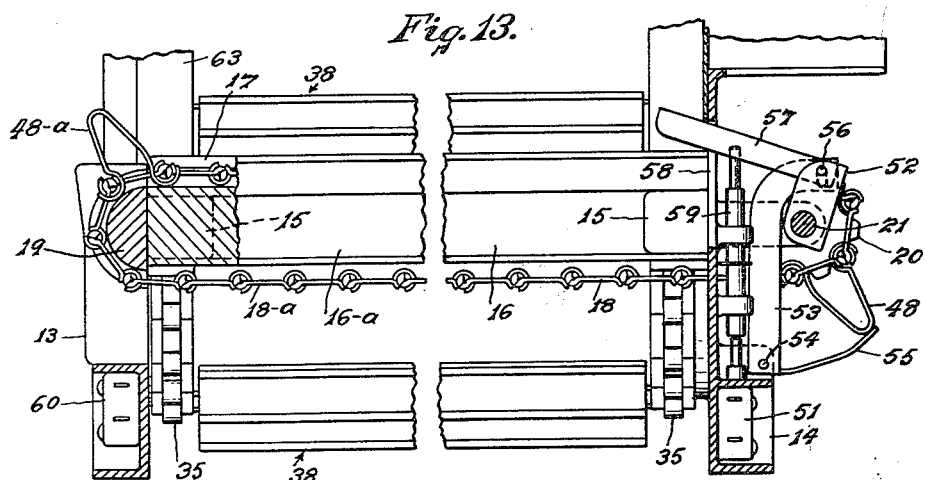
INVENTORS.
JEROME NATHAN
HENRY L. HELMAR.
BY CHARLES E. REBURN.
Louis V. Lucia
ATTORNEY.

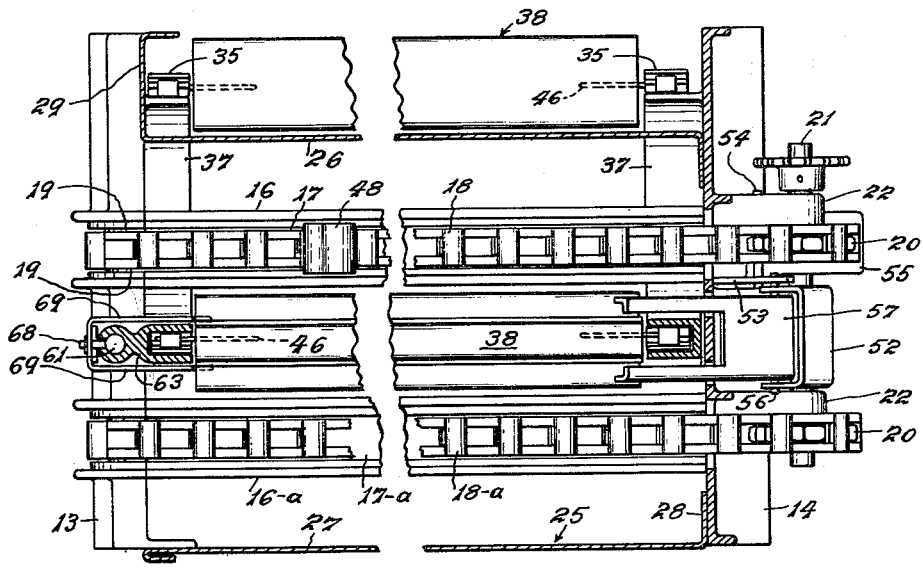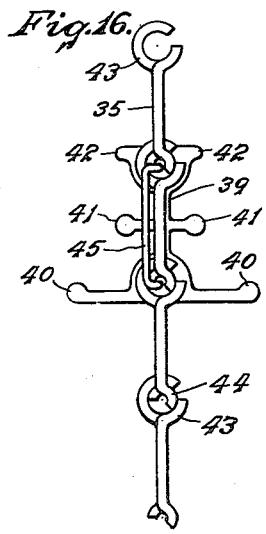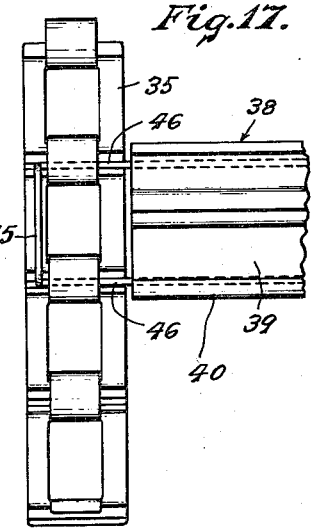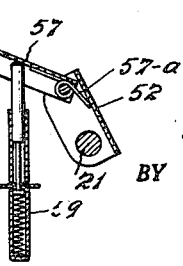

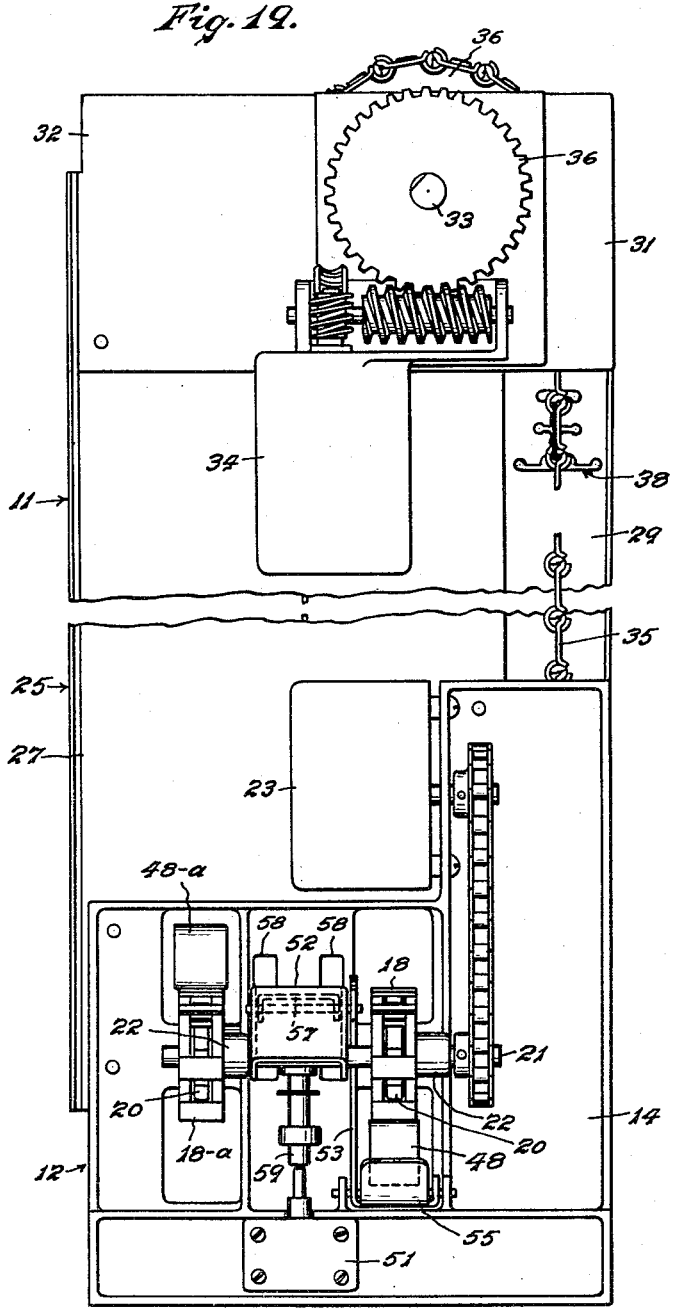

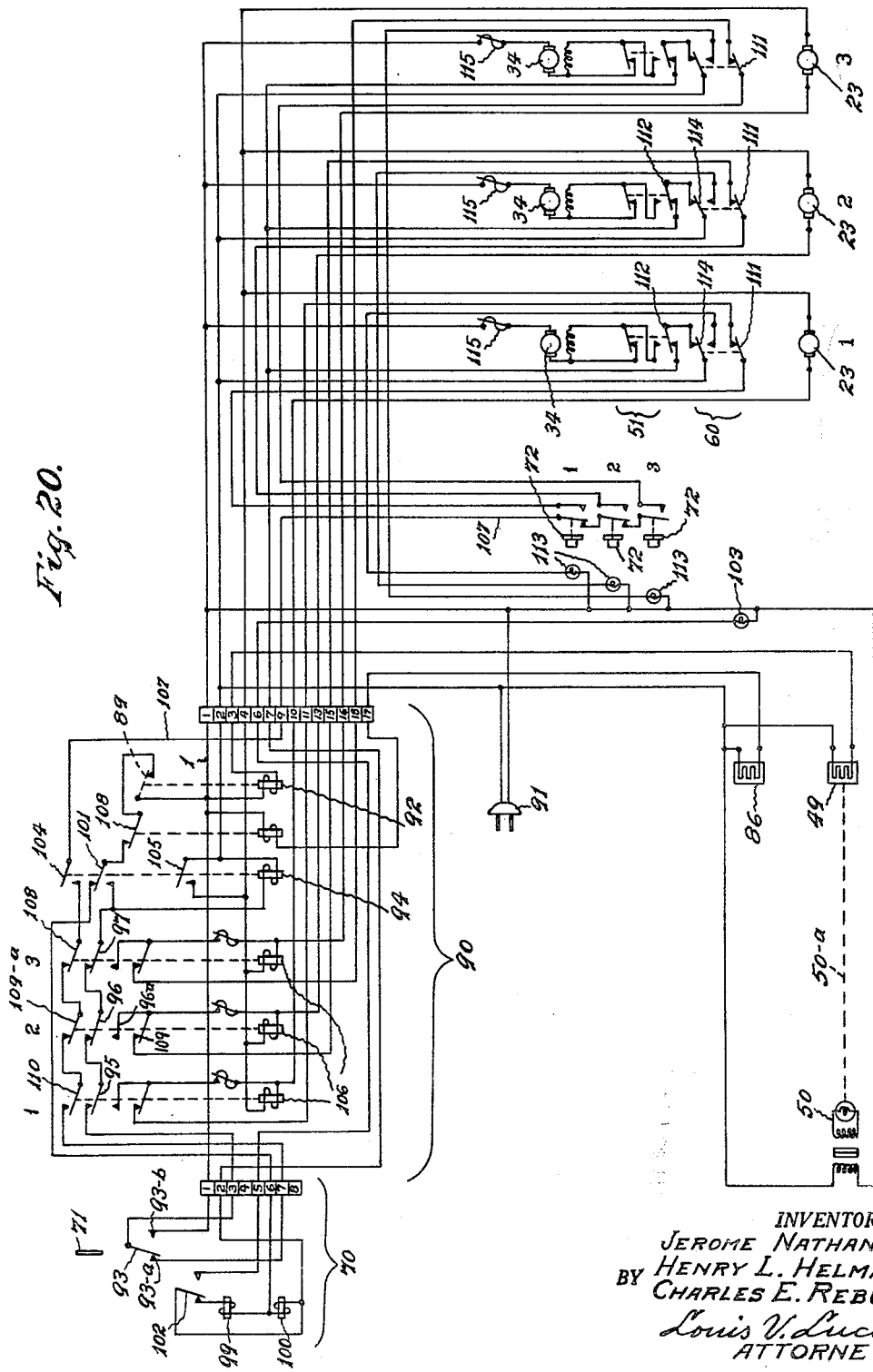

3,185,280
VENDING MACHINE

Jerome Nathan, Manchester, Henry L. Helmar, Torrington, and Charles E. Reburn, West Hartford, Conn., assignors to The Seeburg Corporation, Chicago, Ill., a corporation of Delaware
Filed Aug. 14, 1962, Ser. No. 216,868
17 Claims. (Cl. 194—2)

This invention relates to vending machines and more particularly to an improved vending machine that is adapted to vend milk in paper cartons, or bottles, as well as other articles.

An object of the present invention is to provide a new and improved vending machine which may include one or more vending units, each having an independent article containing and dispensing mechanism.

A further object is to provide a vending unit comprising an elevator for storing and carrying the articles to the dispensing mechanism in two vertical tiers on a single elevator and depositing said articles on a pair of separate dispensing conveyors, whereby said articles are carried to the point of delivery from the machine.

A still further object is the provision of means whereby said dispensing conveyors in a pair will operate alternately so that one conveyor will not distribute articles until the other becomes empty.

A further object is to provide means under the control of one of said conveyors for depositing articles on both conveyors in the pair after the last article has been dispensed therefrom.

Another object of this invention is the provision of a vending machine in which the mechanism may be readily adjusted to accommodate different sizes of cartons or other articles.

Another object is to provide means for preventing tampering with the machine.

Further objects and advantages of the invention will be clearly understood from the following description and the accompanying drawings in which:

FIG. 1 is a front view of a vending machine embodying the present invention; the front door thereof being omitted.

FIG. 2 is a sectional side view of said machine on line 2—2 of FIG. 1.

FIG. 3 is a sectional plan view on line 3—3 of FIG. 1.

FIG. 4 is a front elevational view of said vending machine.

FIG. 5 is a sectional front view of the lower portion of said machine on line 5—5 of FIG. 2.

FIG. 6 is an enlarged sectional side view showing the delivery apparatus in its closed position.

FIG. 7 is a similar view showing said apparatus in its opened position.

FIG. 8 is an enlarged side view of one of the vending units of said machine.

FIG. 9 is a plan view thereof.

FIG. 10 is a front view thereof.

FIG. 12 is a sectional side view of the lower portion of said unit on line 12—12 of FIG. 11.

FIG. 13 is a similar view showing the mechanism in a different position.

FIG. 14 is a sectional plan view on line 14—14 of FIG. 12.

FIG. 15 is a fragmentary sectional side view illustrating the operation of the empty elevator switch in said unit.

FIG. 16 is a further enlarged end view of a portion of the elevator.

FIG. 17 is a side view of a portion of the front side thereof.

FIG. 18 is a sectional side view of a portion of the mechanism for operating the elevator control switch.

FIG. 19 is a rear view of said vending machine.

FIG. 20 is a diagrammatic view of the electrical control circuit of said vending machine.

Figure 11:
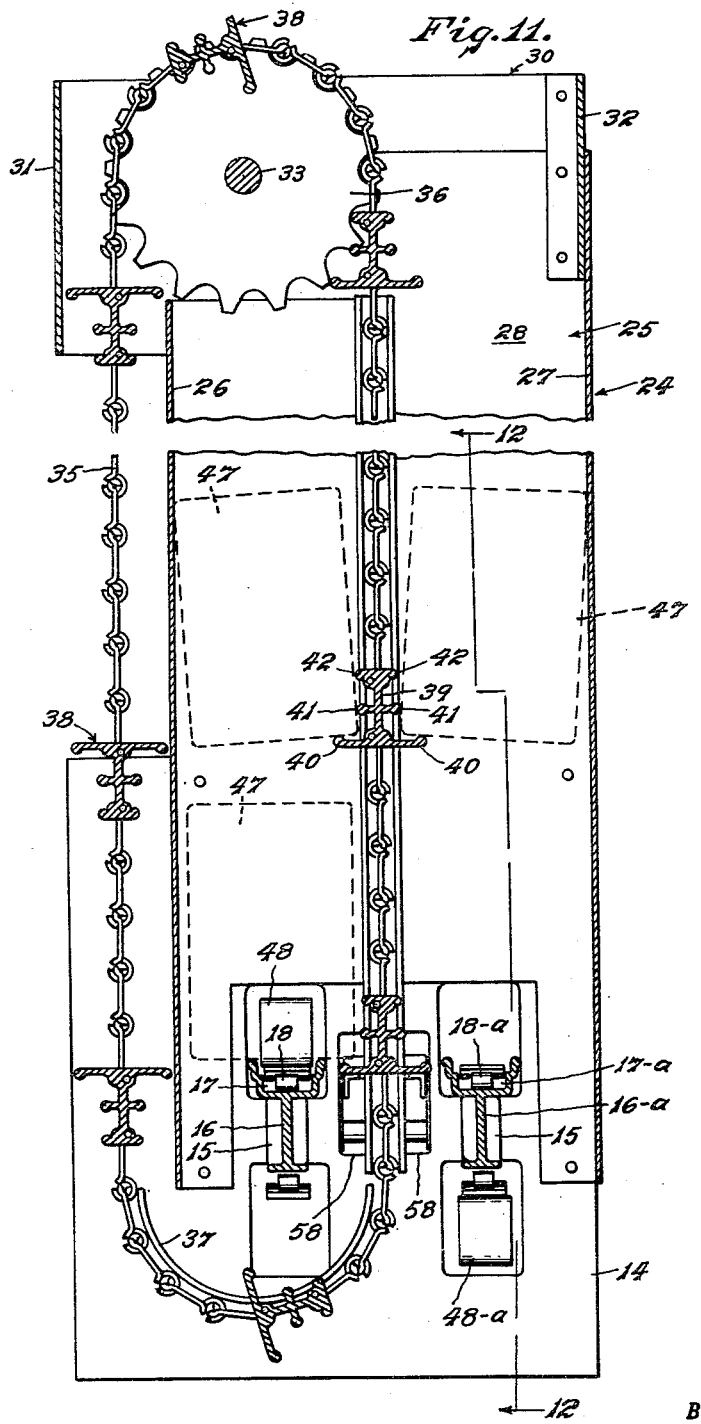
FIG. 11 is a further enlarged sectional front view on line 9—9 of FIG. 8.

As shown in the drawings, the numeral 5 denotes a cabinet having an insulated compartment 6 with side, top and bottom walls 7, 8 and 9, respectively, and a supporting rack 10 which is preferably spaced from said bottom wall.

Within said compartment 6 there is provided the desired number of vending units 11 which are mounted upon the rack 10; the mechanism and construction of said units being the same except that each may be adjusted to contain cartons or articles of a different size as will hereinafter be more fully described.

Each of said units includes a base 12 having front and rear supporting members 13 and 14, respectively, with inwardly extending pairs of projections 15 which support a pair of parallel track bars 16 and 16-a as clearly shown in FIG. 9. These track bars are cross-sectionally shaped to provide an I-beam body portion, the ends of which are received between the projections 15, and a U-shaped upper portion providing channels 17—17-a in which are contained conveyor chains 18 and 18-a, respectively, that are passed around semi-circular track portions 19—19, on the front and rear members 13 and 14, and sprockets 20—20 on a drive shaft 21. Said shaft is mounted in bearings 22—22, which project rearwardly from the rear base member 14, and is driven by an electric motor 23.

A vertical frame portion 24 is mounted upon the members 13 and 14 and comprises a U-shaped upright member 25 having side walls 26 and 27 and a rear wall 28. The side wall 26 having a lateral flange 29 which provides a front wall at one side of said unit.

The frame includes a supporting sub-frame at its upper end that is constructed of angular members 31 and 32 which are secured to the U-shaped member 25 to reinforce the wall portions thereof and mount the upper portions of the storage elevator which will now be described.

A shaft 33 is rotatably mounted in said angular members 31 and 32 and driven by an electric motor 34. A pair of endless elevator chains 35—35 is passed over sprockets 36—36 on shaft 33 and opposed semi-circular track ribs 37—37 extending inwardly from the front and rear members 13 and 14. Said chains carry a series of shelves 38 each comprising an elongated bar 39 having a body portion with oppositely extending article supporting flanges 40—40 and positioning ribs 41—41 and 42—42. In the type of conveyor chain shown, the links are swivelly connected with each other by means of a tubular portion 43 at one end of a link which swivelly receives a connecting portion 44 at the respective end of the adjacent link. The bars 39 are mounted on said chains by means of U-shaped mounting clips 45 having leg portions 46—46 which extend through the tubular portions 43 at the opposite ends of the respective link and into suitable holes 47—47 in the opposite ends of each bar 39. Thereby, the said bars may be readily spaced upon the elevator chains 35—35 to accommodate cartons or articles of different sizes by simply withdrawing said clips and mounting the bars in the required location upon said chains.

As clearly shown in FIGS. 8 and 10, the cartons, indicated at 47, or other articles vended by said machine, are loaded upon both sides of the shelf bars 39 on the downwardly moving flight of the elevator chain by placing them with their inner lower corners upon the oppositely extending ribs 40—40, whereby said articles will tip and bring their outer upper corners into sliding engagement with the wall portions 26 and 27.

The said downwardly moving flight of the elevator chain carries the shelf bars 39 downwardly between the conveyor track bars 16—16-a so that each operation of the elevator will deposit a row of containers upon each of said track bars.

The conveyor chains 18—18-a carry pusher members 48—48-a, respectively, which are mounted on the side of its respective chain, opposite to the side of the other chain on which its pusher member is mounted, as clearly illustrated in FIGS. 10 and 11. Therefore, said pushers will operate alternately to push the containers on their respective tracks so that those on one track of the conveyor will not be pushed into vending position until all of those on the other track have been vended.

In order to control the operation of the conveyor as each article is vended, a photo-electric device is provided which includes a photosensitive element 49 at one side of the machine and an exciter lamp 50 at the other side which projects a light beam 50-a to element 49 across the fronts of all the vending units in the machine so that the said beam is broken by a vended article as it is dispensed from any of the units in the machine.

The operation of the storage elevator to deposit a supply of containers upon the conveyor track bars 16—16 is controlled by a switch 51 at the rear of the unit which is operated by the trigger mechanism illustrated particularly in FIGS. 12 and 13. Said mechanism including a rocker member 52 which is pivotally mounted upon the shaft 21 and is rocked by a lever 53 that is pivoted at 54 upon the rear base member 14 and has an angular extension 55 that is engaged by the pusher 48 on the conveyor chains 18. The said lever 53 is also pivotally connected to the rocker member by means of a slot and pin connection that includes a pivot bar 56 which extends crosswise through said rocker member and pivotally mounts thereon a forked latch 57 which is biased upwardly by a spring 57-a and has prongs which extend through openings 58—58 in the rear member 14 of each unit and are adapted to be engaged by the lower edge of the respective elevator bar 39 to operate the switch 51 through the lost motion operating plunger 59 in the manner to be hereinafter more fully described.

The said elevator is also controlled by an empty elevator switch 60 which, as clearly shown in FIGS. 4 and 5, is mounted in the front base member 13 and operated by a lost motion plunger 61 which is slidable in a bore 62 in a vertical post 63 which also has a longitudinal slot in its inner side that provides a track for the front chain of the elevator and guides the bars of said elevator downwardly between the conveyor track bars 16—16-a; the said plunger including a rod having a tubular portion 64 telescoping thereon and urged downwardly by a spring 65.

A latch member 66 has a spring leg portion 67 which is secured to said plunger 61 by a pin 68 that projects through a vertical slot along the front of the bore 62, and has a pair of inwardly projecting prongs 69—69 with detents thereon engaging the lower edge of the first empty shelf bar of the elevator.

The said vending machine is usually provided with an insulating door 73 which preferably closes the entire front of the cabinet 5. When required, said cabinet may be cooled by a refrigerating unit, not shown, contained within the compartment 74 at the bottom of said cabinet.

A suitable coin operated control device, indicated generally at 70 in FIG. 20, is preferably mounted in said door. Said device receives the required coin in a slot 71 and operates the electric control circuit shown to deliver the article chosen by the purchaser from the respective vending unit in accordance with which one of the article selection buttons 72 has been operated, as will be indicated by the respective one of the indicating lights 113.

The said door 73 also contains a delivery compartment 76, shown in FIGS. 2, 6 and 7, which receives the article being purchased and renders it accessible to be picked up by the purchaser. A removable container 77 is provided upon the bottom of said compartment and is inserted through a swinging rear door 78 that is kept closed by the bottom 9 of the cabinet when the door 73 is closed; said container being preferably of a resilient plastic material to cushion the fall of the purchased article thereinto.

An inwardly swinging access door 79 is mounted against the outer wall of the delivery compartment and biased into closed position by a suitable spring hinge, indicated at 80, to normally close the delivery opening 81 in said front wall.

The said delivery compartment is located just below the plane of the articles on the conveyor bars 16 and 16-a so that as an article is pushed off its conveyor it will fall directly into the container 77 and may be taken therefrom by the purchaser by pushing inwardly the door 79 and reaching through the opening 81.

In order to prevent access through said opening 81 to the articles remaining upon the said conveyors, there is provided a shutter 82 which is hinged at 83 and has extensions 84—84 which are pivotally connected to extension 85—85 on the door 79 whereby, when said door is opened, the said shutter is swung into closed position against the inner side of the door 79 and prevents access to the articles on the conveyors while the door is in open position, as shown in FIG. 7.

The delivery compartment 76 has a suitable photoelectric device which includes the photo-cell 49 at one side thereof and an exciter lamp 50 at the opposite side of the compartment to project a light beam 50-a to said photo-cell across the fronts of each vending unit in the machine. Said beam is interrupted by each vended article, as it is dropped from its respective conveyor into the delivery container 77, and causes opening of a normally open main control switch 89 to stop the respective conveyor motor and thereby prevent the delivery of more than one article for each vending operation of the machine.

To prevent fraudulent tampering with the machine, such as by inserting a light into the delivery compartment to continuously excite the photo-cell 49, which would cause continuous operation of the conveyors and thus the delivery of more than one article for each coin deposited, we provide what is herein called an "anti jackpot" device in the form of an auxiliary photo-cell 86 which is not affected by the beam 50-a from the exciter lamp 50 but is responsive to a light inserted into the delivery compartment to stop movement of the conveyors and thereby prevent jack-pot operation in the manner which will be more fully described hereinafter.

As illustrated in FIG. 20, all of the vending units 1, 2 and 3, are under the control of a relay box containing the electrical relay circuit, indicated generally at 90, which is operated by the coin operated device 70 and the selective push buttons 72 in the manner which will also be described.

The said relay circuit is particularly adapted to prevent fraudulent operation of the selective buttons so as to initiate the operation of more than one vending unit during the interval of time required for the conveyor relays to operate and this feature of the relay circuit will also be more fully described.

Before the said vending machine is operated, the different units therein are filled with the articles to be vended. If desired, different articles may be placed in each unit so that the purchaser operating the machine may choose between several items by simply pressing the proper one of the selective buttons 72.

The articles will be placed only on both sides of the downwardly moving flights of the elevators and, when all of the shelf bars 38 on said flights are filled, the empty switch plunger 61 is attached to the first empty shelf bar by flexing the latch 66 forwardly to release the latch from the shelf to which it was previously attached, then sliding said plunger upwardly on the bar 63 to its proper position and releasing said latch to engage the empty shelf bar, as in FIG. 15.

The machine is then rendered operative by plugging the attachment plug 91 into a suitable electric supply outlet. This will energize the exciter lamp 50 to throw the beam 50–a onto the photo-cell 49 and cause the relay 92 to close the normally open main switch 89 and thereby condition the entire electrical circuit for the vending operations of the machine.

To purchase an article from the machine, the proper coin is inserted in the slot 73 of the conventional coin operated device. The said coin will then trip the switch 93 from the contact 93–a to the contact 93–b, energize the relay 94 through the normally closed switches 95, 96 and 97, and then return to its normal position against the contact 93–a. If the inserted coin requires the return of change, a suitable change return mechanism will operate to release the proper amount of change into the coin return chute 98. In the circuit illustrated in FIG. 20, this change return mechanism is operated by the relays 99 and 100 that are controlled by the switch 101 and also by the switch 102 which further operates the coin box circuit to energize a signal light 103 and thereby indicate when the change return magazine is empty, at which time the relay 100 will cause the inserted coin to drop into the coin return chute.

Since the change return mechanism is common in conventional coin operated devices, such as illustrated, and is not a part of the present invention a detailed description thereof and its operation is omitted.

Energization of the relay 94 will cause the switches 104, 101 and 105 to close against their respective contacts and thereby establish a holding circuit for operating the relays 106 of the different vending units in the machine.

Closing of the switch 104 will connect the wire 107 of the selective buttons 72 to the main wire 1 of the circuit through the switches 108, 109–a, 110, 93, 95, 96, 97, 101 and 89. Operation of any one of these selective buttons will then cause operation of its respective vending unit in the following manner.

Assuming that the purchaser selects the articles contained in unit 2 and he pushes the selective button 72 for said unit 2; this closes the circuit through the contacts 111 of the switch 60 in said unit 2, and the switch 110, and energizes the relay 106 of said unit. The said relay will then open switches 109–a and 109 and close switch 96 against contact 96–a to connect the relay directly to main wire 1 through the switches 96, 97, 101, 108 and 89 and thereby holding said relay energized. This will hold the switch 96 closed against contact 96–a and maintain the conveyor motor 23 of said unit 2 energized. Said motor will then drive the conveyor of said unit 2 and move the articles thereon forward until the one at the front is pushed off the conveyor track bar into the delivery compartment 76. As said article drops, it breaks the beam 50–a to the main photo-cell 49 and thereby de-energizes said photo-cell and the relay 92, causes the switch 89 to return to its normally open position and breaks the connection to main wire 1 through said switch 89, de-energizes the relay 106 and returns the entire electric circuit to its normal condition.

As the pusher 48 pushes the last article off the tract bar 16 of one side of the double conveyor of each respective vending unit, the pusher at the opposite side of the chain of the other conveyor will move up into position to push the articles of the said other conveyor for the vending operations.

When both track bars 16 and 16–a of a conveyor are empty of articles, the pusher 48, which is now at the bottom side of the chain of the first conveyor, will engage the extension 55 and rock the lever 53 to the position shown in FIG. 13, wherein it will disengage the latch 57 from the shelf bar 38 and cause the sequential switch 51 to close the circuit to the elevator motor 34 through the switch 112 and operate the elevator to bring the next full shelf bar down and deliver the articles thereon upon the supporting bars 16 and 16–a of the conveyor.

At the same time, the said switch 112 breaks the circuit to the coin mechanism and conditions it so that it will not receive coins while the elevator is in motion. As the pusher 48 passes the extension 55, it releases the lever 53 and allows it to return the latch 57 to the position shown in dotted lines in FIG. 12 under the tension of the spring 57–a. As the next full shelf bar reaches its delivery position it pushes said latch down, as clearly shown in FIG. 12 and thereby operates the switch 51 to open the circuit to the elevator motor and stop the movement of the elevator in the position shown in FIG. 13 wherein the flange of the shelf bar which supported the articles is below the plane of the track bars 16 and 16–a and the articles are slidably supported entirely by said bars.

The operating plunger 61 is located on the vertical bar 63 so that the latch 66 is engaged by the first empty shelf bar on the elevator. Therefore, as the last full shelf bar nears the conveyor the said plunger will engage the empty switch 60 and break the circuit to the elevator motor 34. Operation of the empty switch also closes the circuit to the indicating light 113 and indicates that the particular unit is empty. At this time another unit may be operated.

When all of the units are empty, all the switches 114 will be in the down position, thereby de-energizing the relays 99 and 100 and causing return of a deposited coin. At the same time, the said switches will energize all the indicating lights 113.

It will be understood from the above description that our improved vending machine operates very simply; it being necessary simply to insert the proper coin and press the selective button for the article chosen and all of the other operations above described will then become automatic.

If a person attempts to jack-pot the machine by inserting a light into the delivery compartment to maintain the main photo-cell energized and thereby render the breaking of the beam 50–a by an article ineffective, the said light will also energize the auxiliary photo-cell 86 which will then open the normally closed switch 108 and thus break the entire circuit and stop multiple deliveries of articles in the same manner as it is done by the main photo-cell 49.

It is believed possible that a person having the ring technique might be able to operate all of the vending units with a single coin by depositing the coin and then tripping all the push buttons 72 successively and quickly in such a manner that all of the relays 106 will be energized during the short time it takes for one relay to operate. Such fraudulent operation of the machine is prevented by having the switches 108, 109 and 110 in series so that upon the operation of any one of the buttons 72 the respective one of said switches will open and render the remaining push buttons ineffective. This anti-multiple unit operation is rendered more positive by also having the switches 95, 96 and 97 in series.

It will be noted that the circuit breaker 115 of each elevator motor is located between the main wire 1 and the motor. This prevents rendering the other units inoperative when the breaker of any one unit operates to disconnect that particular unit.

It will also be understood that the elevator is rendered inoperable by the empty switch 60 and the light 113 will give the "empty" signal immediately after the last full shelf bar has deposited the articles upon the conveyor. This will allow a conveyor full of articles to remain in the machine under refrigeration so that, when the elevator is reloaded and again rendered operable, the first articles vended will be cold while those on the elevator are being cooled.

We claim:

1. In a machine for vending articles, a pair of spaced conveyors for moving said articles to a vending position in said machine, a storage elevator including a flight movable downwardly between and past said pair of conveyors, and means on both sides of said flight for supporting said articles in position to be transferred from said elevator to both of said conveyors by the downward movement of said flight.

2. In a machine for vending articles, a pair of spaced conveyors for moving said articles to vending position, a storage elevator including a pair of spaced chain like members having an upwardly moving flight and a downwardly moving flight, said downwardly moving flight passing between said pair of conveyors, and a plurality of article supporting members between said chain like members adapted for supporting said articles at both sides of said downwardly moving flight in position to cause said articles to be deposited upon both of said conveyors by the downward movement of said flight.

3. In a machine for vending articles, a pair of spaced horizontal bars for slidably supporting said articles, means associated with said bars for moving the articles thereon to a vending position, a storage elevator having a downwardly moving flight passing between said spaced bars, and means on said downwardly moving flight for storing said articles on both sides thereof in position to cause said articles to be deposited on both of said spaced bars.

4. In a machine for vending articles, a vending unit having a pair of spaced vertical side walls, a pair of spaced conveyors between said walls for moving said articles to vending position, a storage elevator comprising a pair of spaced endless chains having an upwardly moving flight and a flight moving downwardly centrally of said side walls and between said conveyors, a plurality of shelf bars on said elevator, each of said bars having a supporting flange on opposite sides thereof to support said articles by a lower corner thereof whereby said articles will tip from the opposite sides of said downwardly moving flight and be retained upon said flanges by sliding engagement with said side walls.

5. In a machine for vending articles, a pair of spaced conveyors each including jointly movable endless members having oppositely moving flights, an elevator having a flight movable between said conveyors and adapted to deposit articles on both of them, one of said conveyors having means on one flight thereof to push the articles thereon to vending position and the other conveyor having similar means on the opposite flight thereof whereby the articles on said other conveyor will not be pushed to vending position until all of the articles on the first conveyor have been vended.

6. In a machine for vending articles, a pair of spaced conveyors each including jointly moving endless members having oppositely moving flights, an elevator having a flight movable between said conveyors and adapted to deposit articles on both of them, the endless member of the first of said conveyors having a pusher member on one flight thereof moving in one direction for pushing the articles on said first conveyor to vending position, the endless member of the second conveyor having a similar pusher member on the flight moving in the opposite direction whereby the said pusher member of the second conveyor will push the articles thereon only after the first conveyor has been emptied of its articles, and means operable by the pusher of the first conveyor for causing operation of said elevator to deposit a supply of articles on both of said conveyors after they have both been emptied of their articles.

7. The subject matter set forth in claim 6 wherein said pusher operable means are also operable by the elevator to stop movement thereof after the articles have been deposited upon the conveyor.

8. In a vending machine, a pair of spaced conveyors each including jointly moving endless members having oppositely moving flights, an elevator having a flight movable downwardly between said conveyors, spaced shelf bars on said elevator for supporting the articles thereon, a pusher on one flight of one of said conveyors, a similar pusher on the opposite flight of the other conveyor, a motor for driving said elevator, a switch for controlling said motor, a lever adjacent to one of said conveyors and operable by the pusher thereof, and a latch mounted upon said lever for operating said switch; said latch being successively engaged by said shelf bars to cause said switch to open and deenergize said motor and disengaged from said shelf bars, when said lever is rocked by the pusher, to cause the switch to close and energize said motor.

9. A vending machine including a vending unit comprising a pair of spaced jointly operable parallel conveyors each including a supporting bar having vertical flanges to support articles thereon and a longitudinal groove between said flanges, an endless chain movable in said groove, a pusher on said chain for pushing articles on said flanges to a vending position, an elevator including a parallel pair of endless chains having a flight movable downwardly between said conveyors, shelf bars on said elevator for supporting articles thereon at both sides thereof and depositing said articles simultaneously upon both conveyors, said shelf bars being adjustable on the elevator chains to accommodate articles of different sizes, U-shaped clips having prongs extending through said elevator chains into the ends of the shelf bars for detachably mounting said bars upon the elevator chains in different positions thereon, a pusher on each of said conveyor chains for pushing the articles on the flanges of the respective supporting bar, means operable by the pusher of one of said conveyors when both conveyors are empty of articles for operating said elevator to deposit a supply of articles upon both conveyors, said operating means being operable to stop the movement of the elevator when a shelf bar has deposited articles on the conveyors and is below the plane of the deposited articles, and separate means adjustably associated with said elevator to render it inoperable after a pre-selected shelf bar has deposited articles upon the conveyor.

10. The subject matter set forth in claim 9, including means for rendering a signal when said pre-selected shelf bar has deposited the articles upon the conveyor.

11. In a vending machine, a conveyor for conveying articles to a vending position, an elevator for storing and depositing the articles on said conveyor, said elevator including a pair of endless chains having a plurality of shelf bars spaced thereon and a flight moving downwardly past said conveyor, an upright post having a track for said flight and a longitudinal bore with a slot opening therein, to, a plunger slidable in said bore, a yieldable detent member secured to said plunger through said slot, a yieldable detent member secured to said plunger and movable along said post to be engaged by a selected one of said shelf bars, a motor for operating said elevator, and a switch operable by said plunger to deenergize said motor when the selected shelf bar has reached a pre-determined position.

12. A vending machine including a plurality of vending units, each of said units having a pair of spaced jointly movable conveyors for moving articles to a vending position in said machine, an elevator having a flight movable downwardly between said conveyors, spaced shelf bars on said elevator for supporting said articles thereon and depositing a supply of said articles upon both of said conveyors, pushers on said conveyors for pushing the articles to the vending position, an electric switch operable by one of said pushers for causing operation of said conveyors, said switch being operable by said elevator to stop movement of the elevator after articles have been deposited upon the conveyors, a separate switch operable to render said elevator inoperable when emptied of articles, means for rendering a signal while the elevator is inoperable, a coin operated device for controlling the operation of said units, said device being operable for returning a deposited coil, and means rendered operable when the elevators of all of said units are inoperative for causing said device to return the deposited coin.

13. The subject matter set forth in claim 12 including means adjustable on said elevator to cause operation of said separate switch by a selected one of said shelf bars.

14. A vending machine including a plurality of vending units each having a conveyor for moving articles to a vending position in said machine, an electric circuit, a motor in said circuit for driving said conveyor, means for causing energization of said motor to dispense one of said articles from the conveyor, a normally open switch in series with said motor, a relay for operating said switch, a photo-electric device including an exciter lamp directing a beam across the path of articles dispensed from all of said units, a photo-electric cell operable by said beam to cause energization of said relay to close said switch whereby when said beam is broken by an article dispensed from any of said units the said relay will be de-energized to open said switch and terminate the operation of the conveyor by said motor.

15. The subject matter set forth in claim 14 including a separate normally closed switch in series with said motor, a separate relay for operating said separate switch, and a separate photo-electric cell independent of said beam and responsive to light from a different source to cause energization of said separate relay and thereby open said normally closed switch and terminate the operation of the conveyor by said motor independently of said beam.

16. A vending machine including a cabinet, a plurality of vending units in said cabinet, a delivery compartment, each of said units including a mechanism for dispensing a vended article therefrom into said compartment, an electric circuit, a motor in said circuit for driving said mechanism, means for causing energization of said motor to vend one of said articles whereby it is dropped into said delivery compartment, a photo-electric device having a beam projected across said compartment and breakable by an article dropped from any of said units to open said circuit and cause de-energization of said motor, and a separate photo-electric cell independent of said beam and operable by a light from a separate source injected into said compartment to open said circuit independently of said beam.

17. A vending machine including a cabinet having a vending unit therein, a conveyor for dispensing articles from said unit, a door for said cabinet and a delivery compartment in said door; said delivery compartment having a normally closed access door in the front wall thereof opening inwardly into said compartment, a shutter on the rear wall of said compartment disposed below said conveyor and normally open thereto, said shutter being operable to swing forwardly from the rear wall against the back of the access door when said access door is opened, and yieldable means for returning said access by door and shutter to their normal positions.

References Cited by the Examiner

UNITED STATES PATENTS

| | | | |
|---|---|---|---|
| 1,946,371 | 2/34 | Walker | 194—10 X |
| 2,440,251 | 4/48 | Devens | 221—111 |
| 2,720,337 | 10/55 | Chater | 221—111 |
| 2,888,165 | 5/59 | Bookout et al. | 194—10 X |
| 2,905,360 | 9/59 | Mihalek | 221—104 X |
| 2,957,603 | 10/60 | Dubois | 221—11 |
| 3,087,648 | 4/63 | Cope | 221—11 |

SAMUEL F. COLEMAN, *Primary Examiner.*

RAPHAEL M. LUPO, WILLIAM B. LA BORDE, *Examiners.*

UNITED STATES PATENT OFFICE
CERTIFICATE OF CORRECTION

Patent No. 3,185,280 May 25, 1965

Jerome Nathan et al.

It is hereby certified that error appears in the above numbered patent requiring correction and that the said Letters Patent should read as corrected below.

Column 6, line 52, for "ring" read -- right --; column 8, line 55, for "therein," read -- therein- --; column 10, line strike out "by".

Signed and sealed this 12th day of October 1965.

(SEAL)
Attest:

ERNEST W. SWIDER
Attesting Officer

EDWARD J. BRENNER
Commissioner of Patents